United States Patent
Harke et al.

(10) Patent No.: US 12,523,607 B2
(45) Date of Patent: Jan. 13, 2026

(54) METHOD AND FLUORESCENCE MICROSCOPE FOR DETERMINING THE LOCATION OF INDIVIDUAL FLUORESCENT DYE MOLECULES BY MEANS OF ADAPTIVE SCANNING

(71) Applicant: ABBERIOR INSTRUMENTS GMBH, Gottingen (DE)

(72) Inventors: Benjamin Harke, Gottingen (DE); Christian Wurm, Gottingen (DE); Lars Kastrup, Gottingen (DE); Roman Schmidt, Gottingen (DE)

(73) Assignee: ABBERIOR INSTRUMENTS GMBH, Gottingen (DE)

(*) Notice: Subject to any disclaimer, the term of this patent is extended or adjusted under 35 U.S.C. 154(b) by 296 days.

(21) Appl. No.: 18/031,698

(22) PCT Filed: Oct. 15, 2021

(86) PCT No.: PCT/EP2021/078646
§ 371 (c)(1),
(2) Date: Apr. 13, 2023

(87) PCT Pub. No.: WO2022/079260
PCT Pub. Date: Apr. 21, 2022

(65) Prior Publication Data
US 2023/0384223 A1    Nov. 30, 2023

(30) Foreign Application Priority Data
Oct. 16, 2020   (DE) .................. 10 2020 127 320.7

(51) Int. Cl.
*G06K 9/00*     (2022.01)
*G01B 11/14*    (2006.01)
(Continued)

(52) U.S. Cl.
CPC ........ *G01N 21/6458* (2013.01); *G01B 11/14* (2013.01); *G02B 21/0076* (2013.01);
(Continued)

(58) Field of Classification Search
CPC . G06T 2207/10064; G06T 2207/10061; G06T 2207/10152; G06T 2207/20021
See application file for complete search history.

(56) References Cited

U.S. PATENT DOCUMENTS 8,120,771 B2 * 2/2012 Wagner-Conrad ... G02B 21/008
                                                    703/12
9,213,176 B2 * 12/2015 Pertsinidis ............. G02B 21/18
(Continued)

FOREIGN PATENT DOCUMENTS

DE   102017104736 B3   8/2018
DE   202019005360 U1   6/2020
(Continued)

OTHER PUBLICATIONS

International Search Report for PCT/EP2021/078646 dated Dec. 14, 2021.
(Continued)

*Primary Examiner* — Hadi Akhavannik
(74) *Attorney, Agent, or Firm* — MOSER TABOADA (57) ABSTRACT

The present invention is a method for spatially highly accurate location determination of individual dye molecules of a fluorescent dye by scanning with an intensity distribution of a scanning light having a local minimum. The invention is characterized by the fact that the scanning is not performed uniformly for all dye molecules, but is individually adapted to the dye molecule to be scanned and, if necessary, to its environment in the sample, in order to achieve the most accurate location determination possible with the smallest possible number of fluorescence photons.

28 Claims, 4 Drawing Sheets

(51) Int. Cl.
 *G01N 21/64* (2006.01)
 *G02B 21/00* (2006.01)
 *G06T 7/70* (2017.01)

(52) U.S. Cl.
 CPC ...... *G06T 7/70* (2017.01); *G06T 2207/10061* (2013.01); *G06T 2207/10064* (2013.01); *G06T 2207/10152* (2013.01); *G06T 2207/20021* (2013.01); *G06T 2207/20081* (2013.01); *G06T 2207/20084* (2013.01); *G06T 2207/30204* (2013.01); *G06T 2207/30241* (2013.01); *G06T 2207/30242* (2013.01)

(56) References Cited

U.S. PATENT DOCUMENTS

| | | | | |
|---|---|---|---|---|
| 10,402,524 | B2* | 9/2019 | Cao | G03F 1/36 |
| 10,761,011 | B2* | 9/2020 | Ota | G01B 11/00 |
| 2010/0225910 | A1* | 9/2010 | Wagner-Conrad | G02B 21/0076 356/243.1 |
| 2015/0177149 | A1* | 6/2015 | Yang | G01Q 90/00 250/235 |
| 2016/0139050 | A1* | 5/2016 | Wuite | G02B 21/0076 250/459.1 |
| 2018/0246030 | A1* | 8/2018 | Ota | G01N 21/6456 |
| 2018/0322234 | A1* | 11/2018 | Cao | G06F 30/39 |
| 2019/0262403 | A1* | 8/2019 | Duma | A61P 25/28 |

FOREIGN PATENT DOCUMENTS

| | | |
|---|---|---|
| DE | 102019108814 A1 | 10/2020 |
| DE | 102019108815 A1 | 10/2020 |
| DE | 102019007066 A1 | 4/2021 |
| DE | 102019008989 B3 | 6/2021 |
| WO | WO 2015097000 A1 | 7/2015 |
| WO | WO 2018069283 A1 | 4/2018 |

OTHER PUBLICATIONS

Balzarotti Francisco et al., "Nanometer resolution imaging and tracking of fluorescent molecules with minimal photon fluxes", Science,vol. 355, No. 6325, Dec. 22, 2016 (Dec. 22, 2016), p. 606-612, DOI: 10.1126/science.aak9913 & Francisco Balzarotti et al., "Supplementary Materials for Nanometer resolution imaging and tracking of fluorescent molecules with minimal photon fluxes", Science, vol. 355, No. 6325, Dec. 22, 2016 (Dec. 22, 2016), p. 606-612, DOI: 10.1126/science.aak9913.

Göttfert F et al., "Strong signal increase in STED fluorescence microscopy by imaging regions of subdiffraction extent", Proc Natl Acad Sci U S A. Feb. 28, 2017;114(9):2125-2130. doi: 10.1073/pnas.1621495114. Epub Feb. 13, 2017. PMID: 28193881; PMCID: PMC5338502.

Gwosch Klaus C et al, "Minflux nanoscopy delivers 3D multicolor nanometer resolution in cells", Jan. 13, 2020 (Jan. 13, 2020), vol. 17, No. 2, p. 217-224, DOI: 10.1038/S41592-019-0688-0 Gwosch Klaus C. et al, "Supplementary Information: MINFLUX nanoscopy delivers 3D multicolor nanometer resolution in cells", New York Jan. 13, 2020 (Jan. 13, 2020), vol. 17, No. 2, p. 217-224, DOI: 10.1038/s41592-019-0688-0 ISSN:1548-7091.

Pape, Jasmin K. et al., "Multicolor 3D MINFLUX nanoscopy of mitochondrial MICOS proteins" In: Proceedings of the National Academy of Sciences of the United States of America, vol. 117, 2020, No. 34, p. 20607-20614.—ISSN 0027-8424 (P); 1091-6490 (E). DOI: 10.1073/pnas.2009364117.

J. Horn et al., Adaptive-illumination STED nanoscopy, PNAS, Sep. 12, 2017, pp. 9797-9802, vol. 114, No. 37, www.pnas.org/cgi/doi/10.1073/pnas.1708304114.

* cited by examiner

METHOD AND FLUORESCENCE MICROSCOPE FOR DETERMINING THE LOCATION OF INDIVIDUAL FLUORESCENT DYE MOLECULES BY MEANS OF ADAPTIVE SCANNING

TECHNICAL FIELD OF THE INVENTION

The invention relates to high-resolution localization microscopy using the MINFLUX principle. In particular, it relates to a method for individually adjusting the scanning parameters when scanning individual dye molecules of a fluorescent dye at a plurality of scanning positions for the purpose of determining the location of the dye molecules. The invention further relates to a fluorescence microscope performing the method.

PRIOR ART

The publication WO 2015/097000 A1 describes a method, now known by the acronym MINFLUX, for the localization of spatially isolated fluorescent dye molecules, in which each of the individual dye molecules is scanned by excitation light at different positions with an intensity distribution exhibiting an intensity minimum. For each of the scanning positions, the fluorescence emission excited by the excitation light is registered, and the location of the respective molecule is inferred from the course of the intensity of the fluorescence light along the positions of the intensity minimum. By its nature, this location determination is subject to error; however, the error of the location determination can be reduced by applying the method iteratively. For this purpose, the scanning positions are adjusted before each iteration step, i.e. arranged closer around the respective assumed location of the molecule. At the same time, the strength of the excitation light is increased so that the intensity gradient increases near the intensity minimum. Alternatively, the measurement time can be increased, which corresponds to an increase in the strength of the excitation light with respect to the amount of effective light. With the parameters adjusted, the molecule is successively illuminated at each of the adjusted scanning positions and the intensity of the fluorescence emission is recorded. From the dependence of the fluorescence signal on the positions of the intensity minimum, the location of the molecule can now be determined with less error than before. These process steps can be repeated until convergence of the location determination or until another termination criterion is reached, for example a predetermined maximum acceptable error. With an achievable localization accuracy of about 1 nm, the MINFLUX method represents the most precise commercially available localization method for fluorescent molecules according to the current state of the art.

WO 2015/097000 A1 further discloses that a (high-resolution) image of the distribution of the molecules in the sample can be obtained from the location data of the individual molecules ("MINFLUX imaging"). This method corresponds to the procedures generally known from STORM and PALM microscopy for generating high-resolution images from a large number of location determinations of individual fluorescent molecules, but in the case of MINFLUX microscopy Zo results in a further increased spatial resolution of the images of 5 nm.

DE 10 2017 104 736 B3 describes a variant of the MINFLUX method in which the scanning of the isolated fluorescent dye molecules is not performed by illuminating them with an intensity distribution of excitation light having a local intensity minimum, but with two essentially complementary intensity distributions of an excitation light and a fluorescence inhibition light. In this case, the intensity distribution of the excitation light comprises a local intensity maximum, while the intensity distribution of the fluorescence prevention light comprises a local intensity minimum at the same location. Specifically, the fluorescence prevention light may be STED light, which prevents excited fluorescent dye molecules from emitting fluorescence photons in the edge regions of the intensity distribution of the excitation light by triggering stimulated emission. Thus, in this embodiment of the method, the excitation light and the fluorescence inhibition light are superimposed with such intensity distributions as is done in RESOLFT and STED microscopy. This variant of the MINFLUX method takes advantage of the fact that the intensity of the fluorescence light registered for the respective fluorescent dye molecule depends on its distance from the local intensity minimum of the fluorescence prevention light, and that its position can be determined with high accuracy from the intensities of the fluorescence light registered for several positions of the intensity minimum of the fluorescence prevention light. Also in this variant of the MINFLUX method, the local intensity minimum can be positioned at a few positions in the sample and the evaluation of the intensities of the registered fluorescence light can be performed according to the same principles as in MINFLUX microscopy. However, as a difference remains that in MINFLUX microscopy the intensity of the fluorescence light from the fluorescent marker increases with increasing distance of its position to the position of the local intensity minimum, while in the embodiment of the method in which the further light is fluorescence prevention light, it decreases with increasing distance.

To acquire a high-resolution image using one of the MINFLUX methods described, it is necessary to scan a large number of dye molecules and determine their locations. Compared to other methods of localization microscopy, for example STORM or PALM microscopy, in which many dye molecules are simultaneously imaged onto a camera and their locations determined, and which are thus inherently parallelized, image acquisition according to the MINFLUX method is comparatively slow, since—at least in the presently known embodiments—a location determination must be performed successively for each luminous dye molecule according to the procedure described above. As a result, the sample is irradiated with light for relatively long periods of time, which can result in bleaching of the fluorescent dye or, in living samples, damage to the sample due to phototoxic effects.

To minimize these weaknesses of the MINFLUX method, it is desirable to scan the dye molecules according to an optimized scheme so that the location determinations can be made in the shortest possible time and in the most photon-efficient manner. In particular, it is important to avoid unnecessary scanning. An approach in this regard was described by J. Pape et al. in "Multicolor 3D MINFLUX nanoscopy of mitochondrial MICOS proteins," Proc. Natl. Acad. Sci. USA 117 (34), 20607 (2020) used by restricting the scanning of dye molecules to regions identified in a fluorescence image of the sample acquired with a camera. This approach avoids scanning dye molecules that are attributable to nonspecific and undesirable background staining in the sample.

It is known that the fluorescence emission of individual dye molecules occurs in so-called bursts, i.e. time-limited bursts of fluorescence photons interrupted by short pauses.

The average fluorescence emission rate during a burst, the duration of a burst, the total number of fluorescence photons emitted in a burst, as well as the frequency and duration of the interruptions vary from dye to dye, but also depending on the binding state of a dye molecule or on the composition of the medium (e.g. the buffer) surrounding the dye molecule. The intensity of the excitation light also significantly affects the characteristics of the bursts. Even fluorescent dyes that are structurally related and have similar spectral absorption and fluorescence properties (e.g., the commercially available cyanine dyes CF® 647 and AlexaFluor® 647) can differ considerably from each other in the expression of their bursts, with an additional strong dependence on the composition of the medium.

The accuracy of the localization of individual dye molecules using the MINFLUX principle depends strongly on the total number of fluorescence photons emitted by a dye molecule before it bleaches or returns to the non-fluorescent state. Ultimately, this number sets a limit on the localization accuracy that can be achieved. However, it is not only the total number of fluorescence photons that determines the accuracy of the localization, but also the distribution of the fluorescence photons among the different scanning positions. From the consideration of the limiting case that all fluorescence photons are emitted and detected at only one single scanning position, it becomes immediately apparent that a location determination requires a (uniform) distribution of the fluorescence photons to the scanning positions. It follows that the scanning of the fluorescence molecules, in particular the number of scanning positions and the dwell time at each scanning position, must be adapted to the (average) total number of fluorescence photons as well as to the average duration of a burst. Scanning all dye molecules according to a uniform scheme regardless of their type and environmental conditions is in any case disadvantageous.

Objective of the Invention

The objective of the invention is to specify a method that enables photon-efficient and speed-optimized data acquisition according to the MINFLUX principle. On the one hand, the aim of the method is to individually adapt the scanning of individual dye molecules in such a way that the most accurate location determination possible is achieved with as few fluorescence photons as possible. On the other hand, the method shortens data acquisition by scanning with scanning parameters adapted to the respective dye and by avoiding unnecessary scanning steps. At the same time, the method can reduce illumination of the sample and thus bleaching of the fluorescent dye at the scanning location, but also in neighboring areas of the sample. Finally, reducing the light dose also reduces the risk of damage occurring in the sample due to phototoxic effects.

Solution

The objectives of the invention are solved by the recited claims.

DESCRIPTION OF THE INVENTION

The invention is based on the realization that for photon-efficient and speed-optimized data acquisition according to the MINFLUX principle, the scanning of the dye molecules must be individually adapted to the type of dye and, if necessary, to the ambient conditions.

For this purpose, the invention comprises a method for spatially highly accurate location determination of individual dye molecules of one or more fluorescent dyes in a sample, wherein the fluorescent dyes are usually coupled to a structure to be investigated in the sample and serve to visualize this structure. According to the invention, each of the fluorescent dyes comprises a first, fluorescent state that emits fluorescence in a fluorescence wavelength range when excited with light of a suitable wavelength, and a second state that exhibits no or negligible fluorescence emission in the fluorescence wavelength range of the first state when excited. The second state is often a non-fluorescent dark state, which can absorb the excitation light if necessary, but does not exhibit fluorescence, but instead thermally re-emits the excitation energy; in this respect, the second state is also referred to as a non-fluorescent state (also in the following description). Strictly speaking, however, non-fluorescence of the second state refers only to the fluorescence wavelength range of the first state of the same dye and to a given excitation wavelength. Therefore, it is explicitly not excluded that the second state of a dye is also fluorescent, but only upon excitation with a wavelength different from the wavelength for excitation of the first state, and/or with fluorescence emission in a wavelength range different from the fluorescence wavelength range of the first state. In this case, the wavelength for excitation of the second state of a dye may well also be the wavelength with which the first, fluorescent state of another dye is excited.

The method comprises generating a distribution of individual dye molecules in the first, fluorescent state. In extreme cases, the distribution may comprise only a single dye molecule in the fluorescent state; in any case, however, it must be ensured that the spacing of adjacent dye molecules of the distribution is above the optical diffraction limit so that adjacent fluorescent dye molecules can be resolved in an optical image, i.e., recognized as separate objects. Furthermore, this distance requirement also applies to dye molecules of different dyes, provided that the dye molecules can be excited to fluorescence in a same fluorescence wavelength range with excitation light of the same wavelength.

The generation of separated, fluorescent dye molecules in a sample is known from the prior art for localization microscopy (PALM, STORM etc.). Spatially separated fluorescent dye molecules can be generated, for example, by thinning out an ensemble of initially fluorescent dye molecules, i.e., by transferring the bulk of the molecules from the first, fluorescent state to the second (non-fluorescent) state. Conversely, distributions of spatially separated fluorescent dye molecules can also be produced by transferring a small number of dye molecules to the fluorescent state if the dye is initially present in the second (non-fluorescent) state. Therein, not all the dye molecules to be scanned must necessarily be prepared at once; it is also possible to photoactivate individual, spatially isolated dye molecules gradually or even one after the other. Selecting a dye molecule can then be done by scanning the sample with photoactivation light until the fluorescence of a (single) dye molecule is detected.

Alternatively, it is also possible to generate a distribution of single, spatially isolated fluorescent dye molecules by adjusting the rates of spontaneous transitions between the first, fluorescent state and the second (non-fluorescent) state so that, at the equilibrium of the reactions, only a very small number of the dye molecules are always in the first, fluorescent state. The reaction rates can be adjusted, for example, by adjusting the composition of a buffer in which the sample is embedded.

To carry out the method, individual dye molecules in the fluorescent state are selected and scanned with a scanning light at several scanning positions according to a scanning rule. In this process, the intensity distribution of the scanning light in the sample exhibits a local minimum. When in the following a scanning position is mentioned, the position of this local minimum is meant. The scanning positions are chosen in such a way that the minimum of the intensity distribution is located at different positions around the (assumed) location of the dye molecule, the distance from the respective dye molecule usually not exceeding 250 nm. Therefore, at least in order to be able to determine the first two or three scanning positions, an approximate knowledge of the location of the respective dye molecule to be scanned is already required in advance. This initial location estimate can be made, for example, by scanning the sample with the excitation light or from a previously acquired fluorescence image; specific methods for this can be found in the prior art for MINFLUX microscopy.

On the one hand, the scanning light may be excitation light, which stimulates those dye molecules that are in the fluorescent state to fluoresce. On the other hand, the scanning light may also be a fluorescence inhibition light, by which is meant any kind of light that prevents, reduces or completely suppresses the fluorescence emission of the dye. In particular, the fluorescence inhibition light may be stimulation light that induces stimulated emission of electronically excited dye molecules, thereby converting the dye molecules (back) to the electronic ground state and thus preventing them from spontaneously emitting fluorescence. Importantly, the scanning light modulates the fluorescence emission of the dye molecules as a function of its intensity, allowing both enhancement of emission (if the scanning light is excitation light) or attenuation of emission (if the scanning light is fluorescence inhibition light/stimulation light). If the scanning light is not itself the excitation light, the dye molecule to be scanned is additionally illuminated with an excitation light.

During the scanning of a dye molecule, the fluorescence of the dye molecule is detected at each scanning position. The fluorescence can be detected with a light detector in photon counting mode, in particular with an avalanche photodiode operated in Geiger mode, which may have a particularly high sensitivity. However, the method can also be implemented with a light detector that generates an output signal proportional to the fluorescence intensity, for example with a photomultiplier.

Finally, the method includes a location determination of the scanned dye molecule from the numbers of photons or the intensities of the fluorescence light and the scanning positions. This location determination is considerably more accurate than the initial location estimation based on which the (first) scanning positions were determined. It is particularly advantageous to continue the scanning with further scanning positions, wherein the further scanning positions are determined on the basis of the location estimate of the dye molecule improved by the location determination. The numbers of photons or intensities of fluorescence light detected at the further scanning positions now allow the location to be determined again with once more improved precision. These steps may be repeated until the location of the dye molecule is determined with an acceptable uncertainty or the location determination has converged, i.e. the uncertainty of the location determination is no longer reduced.

The invention is now based on the idea that a high accuracy and a fast convergence of the location determination can be achieved in a short time and with as few fluorescence photons as possible if the scanning process is individually adapted to the dye molecule to be scanned. The method according to the invention therefore differs from the MINFLUX methods known from the prior art in that the scanning is not performed uniformly for all dye molecules, but that the scanning is individually adapted to the type of the respective dye molecule and, if necessary, its environment in the sample. For this purpose, a scanning rule is determined individually for each dye molecule before scanning begins, according to which the scanning is performed for this dye molecule. In particular, the number and position of the scanning positions, scanning durations assigned to the scanning positions, minimum photon numbers or minimum intensities of the fluorescence light assigned to the scanning positions, waiting times inserted between the scanning positions, and intensities and/or wavelengths of the scanning light applied at the scanning positions can be determined by the scanning rule. Accordingly, a simple scanning rule for dye molecules of the fluorescent dye AlexaFluor® 647 derived from the prior art could be, for example:

1. Set the diameter L of a scanning circle to 70 nm, center the scanning circle at the assumed location of the dye molecule.
2. Position the scanning light (excitation light, 640 nm) successively at four scanning positions evenly distributed on the scanning circle.
3. Wait 14 µs at each scanning position, then illuminate the sample with an optical power of 400 µW of the scanning light for 14 µs. Detect a number of fluorescence photons at each scanning position.

To determine the scanning rule, a raster image of the sample or a section of the sample comprising the dye molecule to be scanned is recorded prior to scanning the dye molecule. According to the invention, the raster image is acquired using a scanning laser microscopy method, i.e., by scanning the sample with focused laser light. The scanning rule to be applied to a molecule to be scanned is now determined from the signal of one pixel of the raster image at the location of the dye molecule or from the signals of several pixels of the raster image in a vicinity of the dye molecule.

For example, the signal from the raster image at the location of the dye molecule can be used to infer the type of dye (if the sample contains different dyes), or to distinguish whether a dye Zo molecule is bound to a structure in the sample or is present as an individual dye molecule. The scanning rule can also be used to match the scanning of a dye molecule to its context in the sample. For example, it may be necessary to minimize exposure of the sample to excitation light if there is another fluorescent dye in the immediate vicinity of a dye molecule that would be bleached out by excessively intense excitation light. Also, in areas of the sample where fast dynamic processes occur, scanning with the scanning light can be performed with a scanning rule optimized for the speed of scanning and location determination, while in less dynamic areas of the sample a scanning rule is used that allows more accurate location determination while accepting a lower scanning speed.

Although it is also conceivable to determine a scanning rule on the basis of the fluorescence photons detected during scanning, without recourse to the raster image a reliable adjustment of the scanning process can only be made after a significant number of photons has been detected. If, up to this point, scanning parameters have been chosen unfavorably, these photons contribute only marginally to an improvement in the location determination and are lost to the measurement. In addition, the photons emitted from a single dye molecule provide no information about the context of the sample in which the dye molecule is located. For example, a single dye molecule that is part of the (targeted) staining of a structure of interest in the sample cannot be easily distinguished from a similar dye molecule that happens to be in a background region of the sample based on its fluorescence emission. In contrast, the raster image of the sample provides information also about the context of the dye molecule to be scanned and thus allows, for example, the classification of the dye molecule as belonging to a structure or to the background.

In the use of a laser scanning raster image, the present invention also differs from the work published by J. Pape et al. in Proc. Natl. Acad. Sci. USA 117 (34), 20607 (2020), in which regions of interest in the sample were determined from a wide-field epifluorescence image for MINFLUX imaging. In order to use a wide-field image to select a sample region of interest or to determine a scanning scheme for a given dye molecule, the positioning of the scanning light must be precisely matched to the (camera) image of the wide-field image. With respect to imaging errors, especially over large image areas, this can only be achieved with sufficient accuracy by elaborate calibration measurements. Most importantly, a (confocal) laser scanning image has improved resolution and, in particular, depth discrimination compared to a wide-field image, which is necessary to reliably classify dye molecules even when the dye molecules are part of the staining of a dense structure, in particular also a three-dimensionally extended structure, and parts of the structure overlap in different planes of the sample. These cannot be distinguished from each other or only insufficiently in a wide-field image due to a lack of resolution and, in particular, a lack of depth discrimination.

In a preferred embodiment of the method according to the invention, a set of scanning rules is determined in advance, i.e. before the scanning of individual dye molecules is started, from which the most suitable scanning rule is selected for each dye molecule to be scanned. The selection of the scanning rule from the set is usually automated, and rule-based selection algorithms can be used. However, in view of the considerable progress in the field of artificial intelligence and deep learning, a neural network trained for this classification task, which processes the raster image or an input vector calculated from the raster image as input, is increasingly suitable for selecting a scanning rule.

The scanning rules of the set can, for example, be matched to dye molecules of different fluorescent dyes or to different dye molecules of the same dye that are present in the sample in different binding states or in different contexts of the sample. The set of scanning rules may thereby also include a scanning rule according to which a dye molecule is not scanned at all, but is skipped if the analysis of the raster image at the location of the dye molecule indicates that the dye molecule is not part of a structure of interest. Such a scanning rule is useful in terms of speed-and light-efficient scanning, especially when a large number of dye molecules are to be scanned.

The scanning rules may consist of fixed sets of scanning parameters; however, it is also possible that individual or all of the scanning parameters of a set are calculated with a function or an algorithm, in which case it is not necessarily required to calculate the scanning parameters for all scanning positions in advance and at once; rather, with the algorithm or the algorithm or calculation rule, scanning parameters can also be calculated successively, optionally also including the photons detected at the previous scanning positions or the intensities of the fluorescence light, in the course of the scanning.

In an alternative embodiment of the method according to the invention, a closed set of scanning rules is not determined in advance, but the scanning rule is determined individually for each dye molecule to be scanned. This can be done, for example, by calculating a function or by executing an algorithm, whereby intensities of one or more pixels of the raster image at the location or in the vicinity of the respective dye molecule are passed as arguments to the function or algorithm.

Even if the scanning rules are set initially, i.e. before the scanning of a dye molecule is started, this does not mean that the scanning must be continued according to the same scanning rule until a final location determination is available. Rather, it may be useful to review and, if necessary, adjust the scanning rule during the course of scanning a dye molecule or between scans of successive dye molecules. For this purpose, the selection of a scanning rule from a set of scanning rules or the calculation of a scanning rule according to a function or by an algorithm may be performed again after a number of scanning positions, wherein also the acquisition of the raster image may be performed again and optionally also the numbers of photons detected at the already scanned scanning positions or the intensities of fluorescence light may be taken into account.

The scanned raster image of the sample required to establish the scanning rules may be acquired in a particularly advantageous manner if a beam deflection unit provided for scanning the dye molecules and/or the scanning light is also used for laser scanning, or if a common beam path or partial beam path is used, thereby reducing the cost of a microscope implementing the method. Most importantly, there is a fixed relationship between the pixels of the raster image and the scanning positions, eliminating the need to compensate for imaging errors of a separate optical image.

In the simplest case, the raster image acquired by laser scanning is a fluorescence image of the sample. In addition to fluorescence intensity, the fluorescence image may also comprise a fluorescence parameter other than image contrast, such as fluorescence lifetime. The fluorescence image may optionally be recorded using two-photon or multiphoton excitation, in which case depth discrimination is also provided if the detection of the fluorescence signal is non-confocal, i.e., in particular, without using a confocal pinhole in front of the detector. In order to obtain a high-contrast fluorescence image, it is preferred in this case that the fluorescent dye for recording the raster image is present to a considerable extent in the fluorescent state and that a distribution of spatially separated dye molecules is generated only after the recording of the raster image by transferring a large proportion of the dye molecules to the non-fluorescent state. This can be done, for example, by selective photodeactivation with the excitation light or a dedicated photodeactivation light (possibly of a different wavelength). The photodeactivation can also take place during the scanning image acquisition of the raster image by the excitation light.

Alternatively, the raster image may be the fluorescence image of a different dye in the sample, in which case the fluorescence image may be acquired at a different excitation wavelength and/or with a spectrally different detection range and thus independently of the dye molecules intended for scanning. For example, a different dye can be used to counterstain and identify a region of interest in the sample for subsequent scanning, such as labeling a cell or an organelle within a cell. Selectively binding fluorescent dyes are available for this purpose, for example DAPI for labeling cell nuclei, so-called MitoTracker™ for labeling mitochondria, or lipophilic carbocyanins (DiI, DiO, DiR) for labeling cell membranes. Such counterstaining allows, for example, a decision to be made as to whether a dye molecule is located in a region of interest in the sample. Also, if necessary, a dye molecule can be assigned to a specific part of the sample (e.g., a cell organelle) and a suitable or optimized scanning procedure may be determined based on this assignment.

A particularly advantageous variant of the process can be realized if the second state of the dye is also fluorescent, but can be (selectively) excited with a different wavelength or fluoresces in a different wavelength range. Such properties are exhibited, for example, by prior art photoconvertible proteins such as EosFP, mMaple or Dendra, which can be converted from a green fluorescent state emitting in the range around 510 nm to a red fluorescent state emitting in the range around 580 nm with activation light in the blue-green spectral region (typically 400 nm-490 nm). In the sense of the present invention, the red state may be understood as the first, fluorescent state, while the green state represents the second, non-fluorescent state with respect to the "red" detection range. A raster image of a structure in the sample labeled with such a fluorescent protein may first be acquired in the green state. Since the fluorescent protein is initially present exclusively or predominantly in this state, a high-signal, high-contrast raster image of the labeled structure can be obtained. By illuminating with photoactivation light, individual protein molecules of the fluorescent protein can then be converted to the red state, which is the fluorescent state with respect to the present invention. These converted protein molecules can now be scanned and their locations determined according to the method of the invention, with the particular scanning rule used being based on the previously acquired raster image. Since only one dye in two states is involved, the stains for recording the raster image and for scanning the protein molecules are thus inherently at the same location, which cannot be achieved with two separate stains. It is also not necessary to convert a fluorescent dye between a dense distribution of the fluorescent state (for recording the raster image) and a highly thinned distribution (for scanning individual dye molecules), nor is it necessary to perform a second staining of the structure with a different fluorescent dye as a counterstain for recording the raster image. Moreover, since the majority of the fluorescent protein remains in the green state even during scanning, it is also possible to record a raster image of the structure again by laser scanning in between, i.e. between the scanning of successive protein molecules, and thus to adapt the scanning rules to dynamic changes in the sample as well.

The fluorescence image may also have multiple channels that differ in excitation wavelength, spectral fluorescence detection range, and/or polarization direction of the excitation light or fluorescence light. In addition to the obvious possibility of detecting several spectrally different counterstains in the sample, it may also be useful to detect the fluorescence of only one dye separately in two or more spectral wavelength ranges. Such a detection scheme is particularly suitable for fluorescence detection of ratiometric indicator dyes, which can be used to determine parameters such as ion concentrations (for example $Ca^{2+}$, $Mg^{2+}$, $Zn^{2+}$, $Na^+$), pH values or membrane potentials from the ratio of fluorescence intensities in the separately detected wavelength regions. These parameters provide spatially resolved functional information about the sample beyond structural information, for example, about the activity of synapses between neurons or about the opening state of ion channels in a cell membrane. In this context, the parameters can be determined for each pixel individually or for groups of pixels and, like the fluorescence intensity, can be used to set individual scanning rules for the dye molecules to be scanned. Similarly, dye molecules can be excluded from scanning if analysis of parameters at the location or in the vicinity of a dye molecule indicates that that dye molecule cannot be assigned to a region or context of interest in the sample. In this sense, a functional selection can also be made in such a way that only dye molecules are scanned in whose vicinity the parameters indicate a state of interest, for example of a cell or a cell organelle.

The fluorescence image can also reflect a time dependence of the fluorescence emission, for example to map the kinetics of the bleaching of the dye. From these kinetics, the photostability of the dye and—if the local dye concentration is known—the average number of emitted fluorescence photons per dye molecule can be inferred, which is an important quantity for determining the number and arrangement of the scanning positions as well as the scanning duration per scanning position.

Although in many cases the raster image is a fluorescence image, the method according to the invention may also be carried out with raster images that have a different image contrast. In particular, second-harmonic generation contrast (SHG contrast), third-harmonic generation contrast (THG contrast), scattered light contrast, reflected light contrast, differential interference contrast (DIC contrast) and polarization contrast can be considered for this purpose. These contrast modes allow assignment or determination of a scanning prescription even based on structures in the sample that do not exhibit fluorescence staining.

To determine a scanning rule from the raster image, various image operations may be applied to it. The analysis may be performed locally, i.e. only taking into account the pixel in which the dye molecule for which a scanning rule is to be derived is located. Local analysis usually involves very little computational effort; in the simplest case, only a thresholding is performed for each pixel of the raster image to determine whether or not a dye is present at the location of the respective image pixel. A decision can then be made, for example, whether to scan a dye molecule present at that location or to proceed with another dye molecule. Alternatively or complementarily, thresholding may also be performed from intensity ratios or correlation amplitudes formed from multiple channels of the raster image or from corresponding pixels or image regions of the raster image and another raster image. Thus, an intensity ratio formed from two color channels provides an information about the identity of one of several spectrally differing fluorescent dyes, and by thresholding the intensity ratio, a suitable scanning rule can be selected from a set of alternative scanning rules.

In particularly advantageous embodiments of the method, however, the analysis of the raster image is performed taking into account the neighborhood of the dye molecule for which a scanning rule is to be determined. For the analysis of the raster image, morphological operations, i.e. neighborhood operators, are then also applied, of which only the basic operations erosion, dilation, opening, closing are mentioned here as examples. For advanced methods of image segmentation and pattern or object recognition, the expert can draw on comprehensive prior art technology from the field of image processing.

Even though the analysis of the raster image must be done once before the scanning of a dye molecule is started in order to determine a scanning rule with which the scanning is started, the analysis may be repeated during the course of the scanning and the scanning rule may be updated. For example, if a unique selection of a scanning rule from a set of scanning rules cannot be made from the initially acquired raster image, it is convenient to first calculate probability values for each scanning rule in the set that the dye molecule will be optimally scanned with that particular scanning rule. The scanning can then be started with the scanning rule for which the highest probability was determined, while in the course of the scanning and taking into account the fluorescence detected in the process, the probability values are updated and the scanning is continued with a different scanning rule, if necessary. Such a situation may occur, for example, in a sample stained with two spectrally similar dyes, so that individual molecules of a dye can only be reliably identified after a sufficient number of fluorescence photons have been detected.

While the method according to the invention is essentially a method for determining the locations of individual dye molecules in a sample, the method may be further developed in such a way that a spatially high-resolution image is reconstructed from the location determinations of many dye molecules. For this purpose, the locations of many dye molecules obtained by the location determinations can be visualized in a two-dimensional representation, for example in the form of a two-dimensional histogram. The generation of such high-resolution representations is known to the skilled person from the prior art for localization microscopy or PALM/STROM microscopy, and is particularly suitable when the dye molecules form a fluorescent stain of a structure in the sample. In a preferred form of display, the high-resolution image is inserted into the raster image so that the raster image provides a suitable context for the high-resolution displayed structures.

In another further development of the method according to the invention, the location of a single dye molecule may be determined repeatedly over longer periods of time in order to generate a temporal representation of the location of the dye molecule in the form of a (motion) trajectory. Again, the visualization of the trajectory may advantageously be done in the context of the raster image. The aforementioned types of visualization may also be combined in this context, for example, trajectories can be displayed as overlays in a high-resolution image of the sample in order to identify possible interactions of structures in the sample that are reflected in a change in the mobility of the tracked dye molecules.

Another aspect of the invention is that capturing the raster image of an area of the sample and generating a high-resolution image from the location determinations of the individual dye molecules provides information at different scales of resolution and over different large areas of the sample, and thus the method according to the invention inherently provides multi-scale imaging of the sample.

This aspect may be further developed in that the raster image is selected by selecting an area in a preview image that represents a larger area of the sample than the raster image. This preview image may be scanned by, for example, fast laser scanning of the sample, especially with a large step size and/or a short integration time per pixel. Alternatively, however, the preview image may also be acquired by another image acquisition method, in particular by direct imaging onto a camera. In this case, the image field of the preview image may in turn be selected by selection in an overview image, which represents an (even) larger section of the sample or the entire sample. Such an overview image may also be captured by a quick scan of the sample or by a camera-based imaging, wherein the overview image may optionally also be stitched together from several, partly overlapping individual images (stitching). By displaying the preview image in the context of the overview image, the raster image in the context of the preview image, and the high-resolution image in the context of the preview image, a multiscale representation of even larger objects, e.g., cell assemblies or entire organisms, may be generated, wherein the resolution of the image acquisition may be locally adapted to the structures in the sample. For this type of display, the use of different color scales is particularly useful to make the high-resolution information recognizable in the context of the overview, preview and/or raster image. For example, the image components recorded by determining the location of individual dye molecules may be displayed in a false color representation in a gray scale representation of the overview image.

The invention further relates to a fluorescence microscope configured to carry out the method according to the invention. For this purpose, the fluorescence microscope comprises at least one light source for excitation light, with which the fluorescent dye in the sample can be excited to fluorescence emission, and a detector for detecting the fluorescence of the fluorescent dye. A particularly suitable detector is an avalanche photodiode operated in photon counting mode, which may have a particularly high sensitivity. However, an analog photomultiplier may also be used as a detector as long as it has sufficient sensitivity.

Further, the fluorescence microscope comprises beam shaping means for forming an intensity distribution, comprising a local intensity minimum, of a scanning light in the sample, wherein this scanning light may be either the excitation light or a fluorescence inhibition light from another light source. Fluorescence inhibition light is again understood here to be any type of light suitable for preventing, reducing, or completely suppressing fluorescence emission from the fluorescent dye. In particular, the fluorescence inhibition light may be stimulation light that induces stimulated emission of electronically excited dye molecules. Thus, unless the scanning light is itself the excitation light, the fluorescence microscope according to the invention comprises light sources for the excitation light and for the scanning or fluorescence inhibition light.

Beam shaping means for forming the intensity distribution of the scanning light with a local intensity minimum may include phase filters or programmable spatial light modulators (SLM), such as those used in STED microscopy.

The fluorescence microscope further comprises a scanning image acquisition unit, with which a raster image of the sample can be acquired by scanning the sample with focused excitation light along a (regular) grid. In this respect, it is thus a common laser scanning microscope, preferably configured as a confocal or STED microscope with a fluorescence contrast.

According to the invention, the fluorescence microscope also comprises a scanning device for positioning the scanning light in the sample and scanning individual dye molecules at a sequence of scanning positions. Scanning of the dye molecules requires, in particular, positioning of the scanning light in the sample with an accuracy of 1 nm or less. At the same time, positioning times in the microsecond range are preferred in order to be able to complete the scanning of a dye molecule at a sufficient number of scanning positions within the duration of a burst of fluorescence photons.

These requirements cannot or cannot adequately be met with mechanical beam deflection units such as galvo mirrors alone. Beam deflection units that do not require moving parts, such as electro-optical or electro-acoustic deflectors, are therefore suitable for the scanning device. With these, the desired positioning times can be easily achieved, but the maximum deflection angles are very limited. For this reason, a preferred embodiment of the fluorescence microscope according to the invention comprises both a galvo scanner in the beam path, with which the beam can be positioned over larger image fields, and an electro-optical deflector, with which the (rapid) scanning of the individual dye molecules is performed. In this case, it makes sense for the scanning device and the scanning image acquisition unit to share the galvanometer scanner, so that a further beam deflection device can be dispensed with. As a result, there is automatically also a fixed spatial relationship between the pixels of the raster image and the scanning positions, and there is no need to match several beam deflection inputs to each other.

In a further development, the fluorescence microscope additionally comprises means for merging a plurality of spatially partially overlapping raster images of the scanning image acquisition unit. These means comprise at least one image processing unit that can perform an alignment and a blending of the individual raster images to the merged raster image. The means may also include an adjustable sample stage that can be used to move the sample between capturing individual raster images, such that the merged raster image may also comprise an image area that exceeds the scanning area of the scanning image capture unit.

Further advantageous embodiments of the invention are apparent from the patent claims, the description and the drawings. The advantages of features and of combinations of several features of the invention described in the description are merely exemplary and may have an alternative or cumulative effect without the advantages necessarily having to be achieved by embodiments according to the invention. Without this altering the subject matter of the appended claims, the following applies with respect to the disclosure content of the original application documents and the patent: further features can be found in the drawings. The combination of features of different embodiments of the invention or of features of different patent claims is also possible in deviation from the chosen back relationships of the patent claims and is hereby suggested. This also applies to such features which are shown in separate figures or are mentioned in the description thereof. These features can also be combined with features of different patent claims. Likewise, features listed in the patent claims may be omitted for further embodiments of the invention.

The indefinite article one used in the patent claims and the description for a feature is to be understood in such a way that, with regard to the number, it can be exactly one or also several embodiments of this feature without requiring an explicit use of the adverb "at least". The features listed in the patent claims can be supplemented by further features, if necessary.

DESCRIPTION OF THE FIGURES

Figure 1:
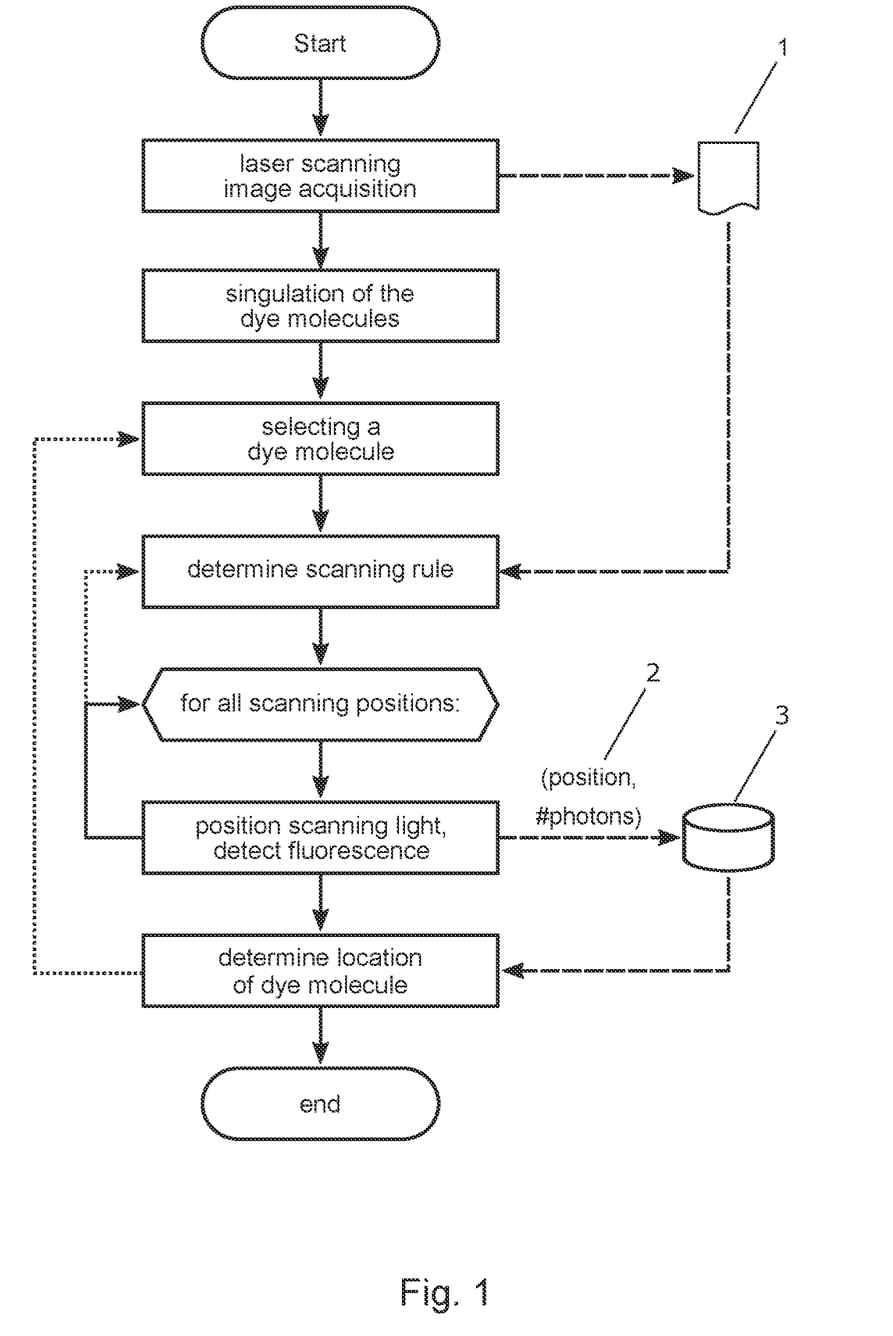
FIG. 1 shows a flow diagram of the method according to the invention.

FIG. 1 shows the method according to the invention in the form of a flow chart. In it, solid lines indicate the sequence of method steps, dotted lines indicate an alternative/optional sequence of method steps, and dashed lines indicate the flow of data. In the first step, a raster image 1 of the sample is acquired by means of scanning image acquisition, on the basis of which scanning rules for scanning individual dye molecules are later determined. As a prerequisite for the subsequent scanning of individual dye molecules, in the second step the dye molecules are singulated, i.e. thinned out in the fluorescent state, for example by illuminating with photodeactivation light, until only isolated fluorescent dye molecules are present whose spacing is above the optical diffraction limit. In particular, if the raster image 1 is a fluorescent image of a different dye or if it uses a different image contrast (for example, a SHG contrast), the acquisition of the raster image 1 and the separation of the dye molecules do not necessarily have to be performed in the order indicated, but may also be performed in reverse.

After the dye molecules of the fluorescent dye are available individually, a dye molecule in the fluorescent state is selected and a suitable scanning rule is determined for this dye molecule, the raster image 1 being analyzed at the location or in the vicinity of the respective dye molecule to determine it. In particular, the number and arrangement of the scanning positions and the scanning duration at the scanning positions are determined by the scanning rule. The dye molecules are then scanned according to the respective previously determined scanning rule, i.e. they are illuminated with an intensity distribution of excitation light having a local minimum or with excitation light and an intensity distribution of fluorescence inhibition light (e.g. stimulation light) having a local minimum at each scanning position, whereby a number of fluorescence photons or alternatively a fluorescence intensity is detected in each case. The number of detected fluorescence photons and the respective scanning position are stored as value pairs 2 in a data memory 3. Optionally, the scanning rule may be updated or redetermined after a dye molecule has been scanned at a portion of the scanning positions and the data recorded in the process indicate that the scanning rule applied is not optimal. Finally, the location of the dye molecule is determined by a method related to triangulation, accessing the value pairs 2 of scanning positions and detected photon counts from the data memory 3 to determine the location. The procedure can optionally be repeated with further dye molecules in the fluorescent state.

The location determination step may also be performed downstream after the scanning of all dye molecules has been completed, particularly if the algorithm used for location determination is computationally intensive and cannot be executed sufficiently quickly between the scanning of successive dye molecules.

Figure 2:
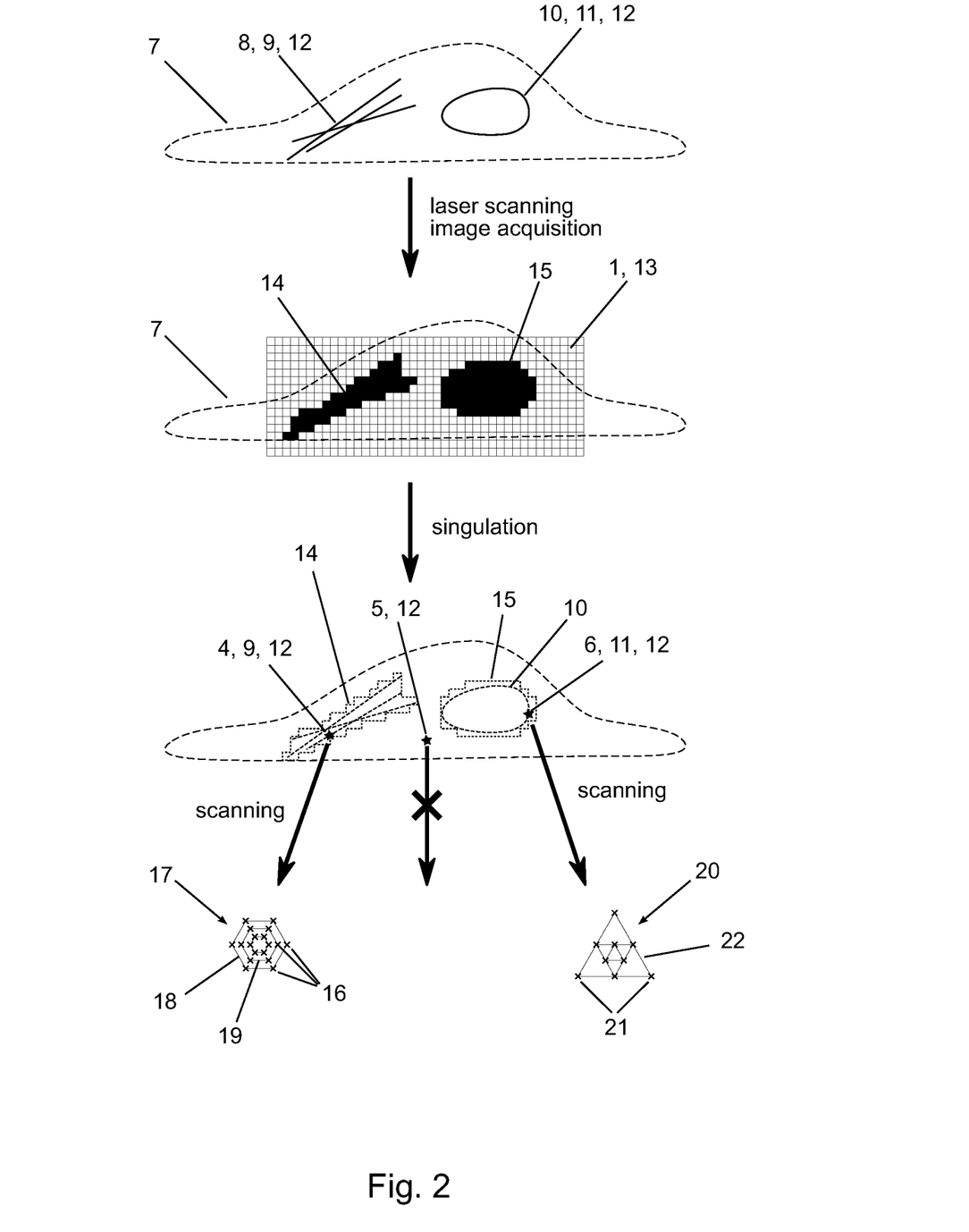
FIG. 2 shows the method according to the invention schematically.

In FIG. 2, the method according to the invention is shown schematically for the location determination of three dye molecules 4, 5, 6 within a cell 7. Within the cell 7, filaments 8 (these may be, for example, actin, vimentin, or another filamentous protein) are stained with a fluorescent dye 9, while a structure of the cell nucleus 10 (for example, the nuclear pore complex) is labeled with a different fluorescent dye 11. Here, the fluorescent dyes 9 and 11 are different but similar in spectral properties, so they can be excited with excitation light of the same wavelength and detected in the same detection range. The use of spectrally similar dyes has the advantage that a common scanning light beam and a common detector can be used for scanning. In addition to the economic advantage, by sharing the scanning means, both color channels are intrinsically aligned to each other and do not need to be adjusted relative to each other.

Both dyes are initially present in a fluorescent state 12, but can be converted to a non-fluorescent state. First, a raster image 1 is taken of the cell 7 or here only a part of the cell 7, the raster image 1 preferably being a confocally detected fluorescence image 13. The fluorescence image 13 shows the filaments 8 in one area 14 and the cell nucleus 10 in another area 15. In this case, the areas 14 and 15, which here represent binary masks, are determined by an image processing (not shown) from the raw data of the raster image. The image processing typically comprises i) dilation steps, which ensure complete coverage of the respective structures, ii) closing steps, by which the areas are closed so that they are free of gaps, and iii) thresholding, by which binary masks are generated from the gray levels.

After recording the raster image 1, the dye molecules of the fluorescent dyes 9, 11 are separated. For this purpose, the initially dense distribution of the dyes must be thinned out to such an extent that only individual, spatially separated and optically resolvable dye molecules 4, 5, 6 remain in the fluorescent state 12. This separation can be achieved, for example, by illuminating with deactivation light, whereby the majority of the dye molecules are converted to the non-fluorescent state.

After separation, the dye molecules 4, 5, 6 may be scanned with scanning light for location determination, wherein a number of photons or an intensity of fluorescence light is detected at each scanning position 16. According to the invention, the intensity distribution of the scanning light, which is excitation light in the illustrated embodiment of the method, comprises a local minimum in the sample. The scanning is shown schematically in the figure for the three dye molecules 4, 5, 6. Dye molecule 4 is located in area 14 and can therefore be assigned to filaments 8, which are labeled with fluorescent dye 9. For the fluorescent dye 9, a scanning rule 17 is chosen which provides six scanning positions 16 of the intensity minimum on an equilateral hexagon 18. From the numbers of fluorescence photons detected at these six scanning positions 16, a location determination is made, whereby the location of the dye molecule 4 is determined with improved accuracy. Now the dye molecule 4 is again scanned at six scanning positions 16 on a now smaller hexagon 19 arranged more densely around the dye molecule 4, and a new location determination is performed. This process can be continued until the location has been determined with the desired accuracy or the location determination has converged.

Dye molecule 5 cannot be assigned to any of the areas 14, 15 and is therefore to be regarded as part of an undesirable, non-specific staining of the sample. Scanning of dye molecule 5 is therefore not performed, and scanning is continued with dye molecule 6. Dye molecule 6 is located in area 15 and can therefore be assigned to nucleus 10, which is labeled with fluorescent dye 11. For this fluorescent dye 11, a scanning rule 20 is chosen which provides three scanning positions 21 of the intensity minimum on an equilateral triangle 22. Scanning is performed according to the same principle as for the dye molecule 4, but only at three scanning positions each on successively smaller triangles. In addition, the scanning duration per scanning position for dye molecule 6 may differ from that for dye molecule 4.

Figure 3:
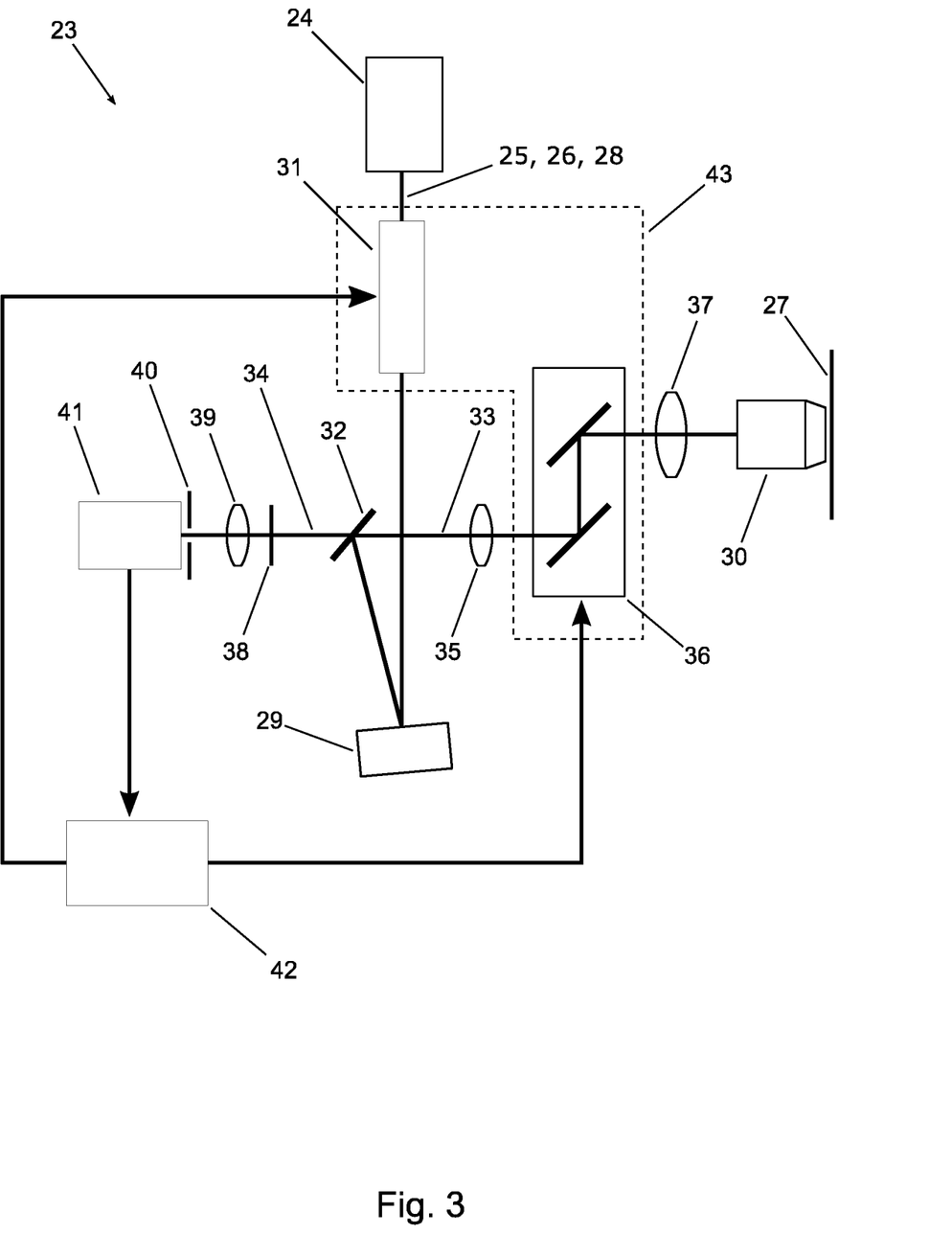
FIG. 3 shows a fluorescence microscope according to the invention.

FIG. 3 schematically shows the setup of a fluorescence microscope 23 according to the invention. A light source 24 provides excitation light 25, which in the embodiment shown is also the scanning light 26. To form the intensity distribution of the excitation or scanning light in the sample 27, which comprises a local minimum, a spatial light modulator (SLM) 29 is arranged in the beam path 28 of the excitation light 25, by means of which the wave front of the excitation light 25 is modified in such a way that, when the excitation light 25 is focused by the microscope objective 30, the intensity distribution with an intensity minimum results. In the beam path 28 of the excitation light 25, there is further an electro-optical deflector (EOD) 31 for rapid positioning of the intensity distribution of the excitation light in two directions in the sample 27.

The excitation light 25 reflected by the spatial light modulator (SLM) 29 is coupled into a main beam path 33 of the fluorescence microscope 23 by a beam splitter 32. The beam splitter 32 is advantageously configured as a narrow-band reflecting dielectric notch filter whose reflection range overlaps as little as possible with the emission spectrum of the fluorescent dye, so that only small portions of the fluorescence light 34 propagating in the main beam path 33 in the opposite direction to the excitation light 25 are reflected out of the main beam path 33. The excitation light 25 is directed into the rear aperture of the microscope objective 30 by a scan lens 35, a scanner 36 shown here as an example in a quad configuration for only one scanning direction, and a tube lens 37. The fluorescence light 34 received by the microscope objective 30 from the sample 27 propagates along the main beam path 33 in the opposite direction to the excitation light 25, being transmitted by the beam splitter 32. The fluorescence light 34 is separated from reflected excitation light 25 and from scattered light by a filter 38, and is focused onto a detector 41 by a lens 39 through a confocal pinhole 40.

In the configuration shown, the scanning device 43 is configured for scanning individual dye molecules jointly by the electro-optic deflector (EOD) 31 and the scanner 36. Here, the scanner 36 serves a comparatively slow prepositioning of the focused excitation light 25 on a dye molecule in the fluorescent state in the sample 27, but possible over a large field of view, while the EOD 31 serves the positioning of the intensity minimum at the scanning positions closely arranged around a dye molecule. In this regard, the EOD 31 allows positioning at high speed, but with a positioning range limited to a few micrometers. At the same time, the scanner 36 is also part of the scanning image acquisition unit which, together with the detector 41, allows confocal image acquisition of the sample 27 to acquire raster images which can be used to determine the scanning rules for scanning individual dye molecules in the sample 27.

Finally, the illustrated fluorescence microscope 23 comprises a control and image processing unit 42 which, on the one hand, controls the actuation of the scanner 36 and the readout of the detector 41 for a confocal image acquisition and, on the other hand, allows a scanning of individual molecules at a sequence of scanning positions by a corresponding coordinated actuation of the EOD 31 and the scanner 36. The control and image processing unit 42 further includes a computing unit for image analysis of the raster image and for computing scanning rules from the raster image. The control and image processing unit is typically implemented as a programmable computer, a programmable integrated circuit, or a microcontroller with appropriate input and output interfaces.

Figure 4:
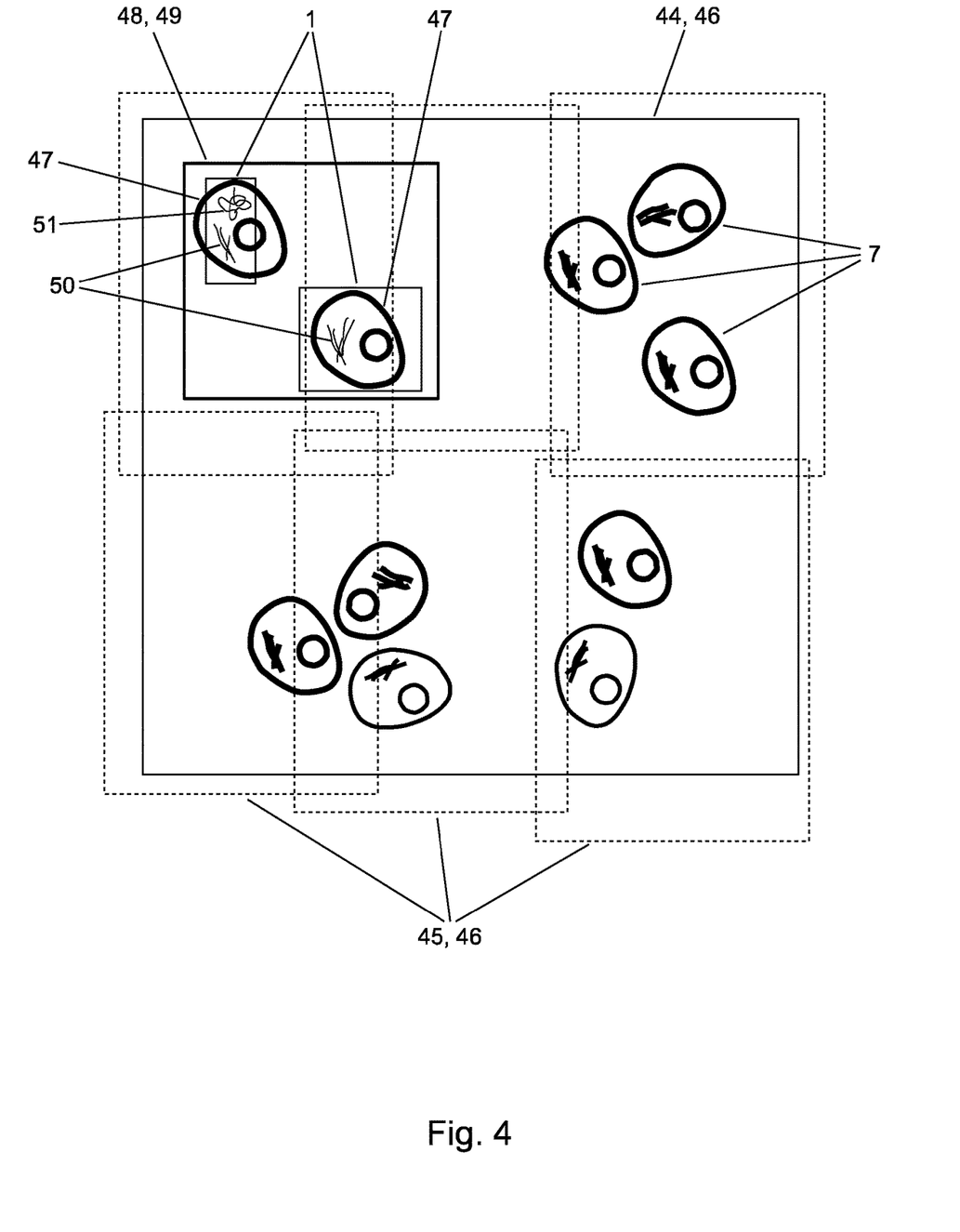
FIG. 4 shows a display mode of the data collected by the method according to the invention.

FIG. 4 shows a preferred representation of locations of dye molecules determined by the method according to the invention in the form of reconstructed, high-resolution images 50 and trajectories 51 in the context of a larger area of the sample. Here, the method according to the invention is embedded in a workflow of several image acquisition steps, starting with the acquisition of an overview image 44 of the sample, wherein the overview image 44 has been stitched together from several overlapping individual images 45, for example several transmitted light images 46 acquired at low magnification. The overview image 44 shows a large area of the sample with many cells 7, 47, thus providing context on a large scale but with low spatial resolution. Of the cells 7, 47 discernible in the overview image 44, a few cells 47 are now selected for closer examination, of which a preview image 48, for example a confocal fluorescence image 49, is acquired in the next step. In this preview image 48, for example, the fluorescence staining of the selected cells 47 may be checked. Location determinations of individual dye molecules are now made in the selected cells 47 to determine high-resolution images 50 of structures and trajectories 51 of individual dye molecules in the selected cells 47. According to the invention, the location determinations of individual dye molecules are made by taking raster images 1 of sections of the sample, each of which here contains a cell 47 or parts of a cell 47, and by scanning individual dye molecules according to scanning rules determined from the raster images 1. The display of the high-resolution images 50 or trajectories 51 generated from the location determinations of many dye molecules or from the repeated location determinations of a single dye molecule is performed in the context of the raster image 1, the preview image 48 and the overview image 44.

LIST OF REFERENCE SIGNS

1 Raster image
2 Value pairs
3 Data memory
4 Dye molecule
5 Dye molecule, not selected
6 Dye molecule
7 Cell
8 Filaments
9 Fluorescent dye
10 Nucleus
11 Fluorescent dye
12 fluorescent state
13 Fluorescence image
14 Area
15 Area
16 Scanning position
17 Scanning rule
18 Hexagon
19 smaller hexagon
20 Scanning rule
21 Scanning position
22 Triangle
23 Fluorescence microscope
24 Light source
25 Excitation light
26 Scanning light
27 Sample
28 Beam path
29 Spatial Light Modulator (SLM)
30 Microscope objective
31 electro-optical deflector (EOD)
32 Beam splitter
33 Main beam path
34 Fluorescence light
35 Scan lens
36 Scanner
37 Tube lens
38 Filter
39 Lens
40 Pinhole
41 Detector
42 Control and image processing unit
43 Scanning device
44 Overview image
45 Individual image
46 Transmitted light image
47 Cell
48 Preview image
49 Fluorescence image
50 High resolution image
51 Trajectory

The invention claimed is:

1. A method for spatially highly accurate localization of individual dye molecules of one or more fluorescent dyes in a sample, wherein the fluorescent dyes are convertible in at least one direction between a first, fluorescent state, which can be excited to fluorescence emission in a fluorescence wavelength range, and a second state which does not exhibit fluorescence emission in the fluorescence wavelength range of the first state when the first state is excited, comprising:
generating a distribution of individual dye molecules in the first, fluorescent state, wherein a spacing of adjacent fluorescent dye molecules that emit fluorescence in the same fluorescence wavelength range upon excitation with an excitation light is above the optical diffraction limit;
selecting a fluorescent dye molecule from the distribution, wherein a location of the selected dye molecule is approximately known;
exciting the selected dye molecule with the excitation light;
scanning the dye molecule with an intensity distribution comprising a local minimum of a scanning light at a plurality of scanning positions arranged at a distance of not more than 250 nm from the location of the dye molecule according to a scanning rule, wherein the scanning light may be the excitation light or a fluorescence inhibition light;
detecting a number of photons or an intensity of fluorescence light at each scanning position;
determining the location of the dye molecule from the numbers of photons or intensities of fluorescence light and the scanning positions with a location uncertainty reduced by at least a factor of 10,
wherein prior to scanning the dye molecule, a raster image of the sample or of a section of the sample comprising the dye molecule is recorded by scanning laser microscopy, wherein the scanning rule for scanning the dye molecule is determined from a signal of a pixel of the raster image at the location of the dye molecule or from signals of several pixels of the raster image in a vicinity of the dye molecule, and wherein determining the scanning rule comprises individually adapting a number and/or a position of the scanning positions to a type of the selected dye molecule.

2. The method according to claim 1, wherein the location of the selected dye molecule is approximately known with a location uncertainty of less than 250 nm.

3. The method according to claim 1, wherein the scanning rule specifies one or more of the following parameters:
   scanning durations assigned to the scanning positions,
   minimum photon numbers or minimum intensities of fluorescence light assigned to the scanning positions,
   waiting times inserted between the scanning positions,
   intensities of the excitation light and/or the scanning light assigned to the scanning positions,
   wavelengths of the excitation light and/or the scanning light.

4. The method according to claim 1, wherein determining the scanning rule comprises selecting a scanning rule from a set of predetermined scanning rules.

5. The method according to claim 4, wherein the scanning rules of the set are adapted to properties of different fluorescent dyes.

6. The method according to claim 4, wherein the selection of the scanning rule is performed by an artificial neural network trained for this task using the raster image or an input vector calculated from the raster image as input.

7. The method according to claim 1, wherein determining the scanning rule comprises calculating a function or executing an algorithm, wherein the signals of one or more pixels of the raster image are passed as arguments to the function or algorithm.

8. The method according to claim 1, wherein the scanning rule is updated or redetermined after scanning the dye molecule at a part of the scanning positions, and wherein the scanning is continued according to the updated or redetermined scanning rule.

9. The method according to claim 8, wherein the updating or the redetermination of the scanning rule is performed by taking into account the numbers of photons or the intensities of the fluorescence light detected at the already scanned scanning positions.

10. The method according to claim 1, wherein a common scanning device, the same excitation light, a common beam path and/or a common partial beam path are used for the scanning of the dye molecules and for the scanning acquisition of the raster image.

11. The method according to claim 1, wherein the raster image is a confocally detected raster image or a raster image recorded with multiphoton excitation with a fluorescence intensity signal or a fluorescence lifetime signal.

12. The method according to claim 11, wherein also the second state is a fluorescent state which can be selectively excited with a wavelength different from the wavelength of the excitation light and/or whose fluorescence emission occurs in a wavelength range different from the fluorescence wavelength range, and wherein the fluorescence emission of the second state forms the fluorescence intensity signal or the fluorescence lifetime signal of the raster image.

13. The method according to claim 11, wherein the raster image having the fluorescence intensity signal or the fluorescence lifetime signal comprises a plurality of channels differing in excitation wavelength, a detection wavelength range and/or a polarization direction of the excitation light or the detected fluorescent light.

14. The method according to claim 11, wherein the determination of the scanning rule comprises a calculation of a parameter derived from the fluorescence intensity signal or from the fluorescence lifetime signal of the raster image in individual pixels or in groups of pixels of the raster image.

15. The method according to claim 14, wherein the parameter is a pH value, an ion concentration or a fluorescence anisotropy.

16. The method according to claim 1, wherein the raster image comprises an image contrast selected from the group consisting of second harmonic generation contrast, third harmonic generation contrast, scattered light contrast, reflected light contrast, differential interference contrast, polarization contrast.

17. The method according to claim 1, wherein determining the scanning rule comprises calculating signal ratios or correlation amplitudes between corresponding pixels or regions of pixels in the raster image and in a further raster image or between a plurality of channels of the raster image.

18. The method according to claim 1, wherein determining the scanning rule comprises thresholding the signal, a parameter derived from the signal, a signal ratio, or a correlation amplitude.

19. The method according to claim 1, wherein determining the scanning rule comprises segmenting the raster image based on the signal, a parameter derived from the signal, an intensity ratio or a correlation amplitude.

20. The method according to claim 1, wherein dye molecules are not selected if the signal of the raster image at the location of the respective dye molecule or in the vicinity of the respective dye molecule falls below a minimum value or exceeds a maximum value.

21. The method according to claim 1, wherein generating the distribution of individual dye molecules of the fluorescent dye in the first, fluorescent state is performed by illuminating the sample with photoactivation light or with photodeactivation light, and wherein the intensity of the photoactivation light or the photodeactivation light is adjusted based on the raster image.

22. The method according to claim 1, wherein a high-resolution image of the sample is reconstructed from the locations of a plurality of dye molecules.

23. The method according to claim 22, wherein the high-resolution image is displayed in the raster image.

24. The method according to claim 1, wherein a dye molecule is repeatedly scanned and its location is repeatedly determined, and wherein a trajectory of the dye molecule is generated from the repeatedly determined locations.

25. The method according to claim 24, wherein the trajectory is displayed in the raster image.

26. The method according to claim 1, wherein the section of the sample in which the raster image is recorded is selected by marking an area in a larger preview image.

27. The method according to claim 26, wherein an image area of the preview image is selected by marking an area in an overview image, the overview image comprising an even larger image area than the preview image.

28. A fluorescence microscope comprising
   a light source for excitation light,
   a beam shaping device for forming an intensity distribution comprising a local intensity minimum of a scanning light in a sample, wherein the scanning light may be the excitation light or a fluorescence inhibition light of another light source,
   a scanning device for positioning the scanning light in a sample,
   a detector for detecting fluorescence light from the sample,
   a scanning image acquisition unit, wherein the fluorescence microscope is configured to perform a method according to claim 11.

\* \* \* \* \*